United States Patent
Haremaki

(10) Patent No.: US 10,890,427 B2
(45) Date of Patent: Jan. 12, 2021

(54) NOZZLE INSPECTION METHOD AND APPARATUS

(71) Applicant: SUGINO MACHINE LIMITED, Uozu (JP)

(72) Inventor: Hiroki Haremaki, West Bloomfield, MI (US)

(73) Assignee: SUGINO MACHINE LIMITED, Uozu (JP)

( * ) Notice: Subject to any disclaimer, the term of this patent is extended or adjusted under 35 U.S.C. 154(b) by 0 days.

(21) Appl. No.: 16/116,835

(22) Filed: Aug. 29, 2018

(65) Prior Publication Data
US 2019/0187173 A1  Jun. 20, 2019

Related U.S. Application Data

(60) Provisional application No. 62/599,212, filed on Dec. 15, 2017.

(51) Int. Cl.
*G01B 5/008* (2006.01)
*B05B 15/555* (2018.01)
*B08B 3/04* (2006.01)
*B08B 9/049* (2006.01)
*G01Q 10/04* (2010.01)
(Continued)

(52) U.S. Cl.
CPC ............ *G01B 5/008* (2013.01); *B05B 15/555* (2018.02); *B08B 3/04* (2013.01); *B08B 9/0495* (2013.01);
(Continued)

(58) Field of Classification Search
CPC .... G01Q 10/045; G01Q 10/04; G01B 21/042; G01B 5/008; G01B 5/20; G01L 5/0052;
(Continued)

(56) References Cited

U.S. PATENT DOCUMENTS 3,449,948 A * 6/1969 Kahle ...................... F02C 7/22
73/114.46
5,461,797 A * 10/1995 Royer ..................... G01B 5/202
33/501.14
(Continued)

FOREIGN PATENT DOCUMENTS

DE        195 17 775 A1   12/1995
DE   10 2011 008 002 A1    7/2012
(Continued)

OTHER PUBLICATIONS

Office Action dated Oct. 29, 2019 in a corresponding JP Patent Application 2018-147984.
(Continued)

*Primary Examiner* — Mikhail Kornakov
*Assistant Examiner* — Richard Z. Zhang
(74) *Attorney, Agent, or Firm* — United IP Counselors, LLC

(57) ABSTRACT

A method for inspecting a nozzle includes producing a jet from the nozzle, moving the nozzle to cause the jet to approach a stylus of a touch probe, generating a contact signal under a force acting on the stylus, and determining that the jet is appropriate in response to a contact signal received first after the jet has an axis at a distance from the stylus that is equal to or less than a first normal distance calculated from a normal jet shape.

13 Claims, 11 Drawing Sheets

(51) Int. Cl.
*G01Q 70/02* (2010.01)
*B08B 5/02* (2006.01)
*G01B 5/20* (2006.01)
*B08B 3/02* (2006.01)
*G01N 35/10* (2006.01)

(52) U.S. Cl.
CPC ........... *G01Q 10/045* (2013.01); *G01Q 70/02* (2013.01); *B08B 3/02* (2013.01); *B08B 5/02* (2013.01); *G01B 5/20* (2013.01); *G01N 35/1004* (2013.01)

(58) Field of Classification Search
CPC ... B05B 12/004; B05B 12/006; B05B 12/082; B05B 12/18; B05B 15/18; B05B 15/50; B05B 15/555; B08B 3/02; B08B 3/04; B08B 3/00
See application file for complete search history.

(56) References Cited

U.S. PATENT DOCUMENTS

| | | | |
|---|---|---|---|
| 6,508,112 B1* | 1/2003 | Verhoeven | G01L 5/0052 73/114.46 |
| 9,364,869 B2 | 6/2016 | Haremaki et al. | |
| 9,393,627 B2 | 7/2016 | Hirasaka et al. | |
| 9,630,217 B2 | 4/2017 | Mitsue et al. | |
| 2002/0040611 A1* | 4/2002 | Uwai | G01B 5/20 73/866.5 |
| 2010/0030368 A1* | 2/2010 | Hon | G01B 5/20 700/195 |
| 2010/0170329 A1 | 7/2010 | Greeves | |
| 2015/0075573 A1 | 3/2015 | Nirasaka | |
| 2016/0334296 A1* | 11/2016 | Cronvall | B41F 33/00 |

FOREIGN PATENT DOCUMENTS

| | | |
|---|---|---|
| JP | 05055015 U | 7/1993 |
| JP | 09095218 A | 4/1997 |
| JP | H09-303236 A | 11/1997 |

OTHER PUBLICATIONS

Extended European Search Report dated Nov. 30, 2018 in the corresponding European Patent Application No. 18192568.6, 12 pp.
Office Action dated Feb. 27, 2020 in a corresponding Korean Patent Application No. 10-2018-0106269.

* cited by examiner

NOZZLE INSPECTION METHOD AND APPARATUS

CROSS-REFERENCE TO RELATED APPLICATIONS

This application claims the benefit of priority to U.S. Patent Application No. 62/599,212, filed on Dec. 15, 2017, the entire contents of which are hereby incorporated by reference.

BACKGROUND

1. Technical Field

The present invention relates to a nozzle inspection method and a nozzle inspection apparatus.

2. Description of the Background

A known inspection method for tools may use a touch probe fixed on a work table that is contacted with a tool to detect any breakage of the tool.

BRIEF SUMMARY

A cleaning apparatus for cleaning a workpiece using a jet has its nozzle kept apart from the workpiece during cleaning. The use of a touch probe for measuring a bend or a curve of the nozzle thus cannot ensure effective cleaning. One or more aspects of the present invention are directed to a nozzle inspection method to be used by a cleaning apparatus.

A first aspect of the present invention provides a method for inspecting a nozzle, including:
 producing a jet from a nozzle;
 moving the nozzle to cause the jet to approach a stylus of a touch probe;
 generating a contact signal under a force acting on the stylus; and
 determining that the jet is appropriate in response to a contact signal received first after the jet has an axis at a distance from the stylus that is equal to or less than a first normal distance calculated from a normal jet shape.

A second aspect of the present invention provides a nozzle inspection apparatus that uses the above method for inspecting a nozzle for breakage.

DETAILED DESCRIPTION

Figure 1:
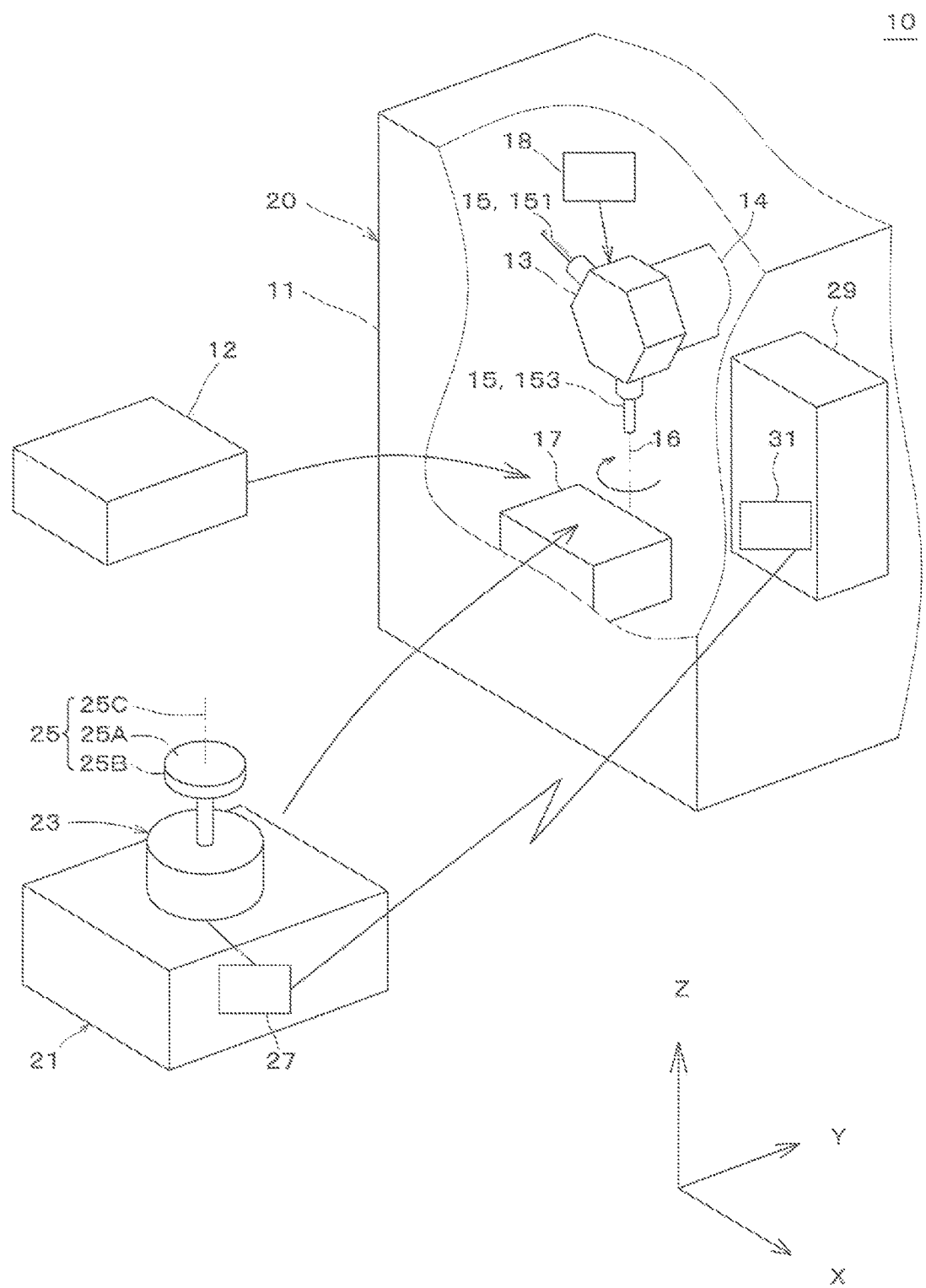
FIG. 1 is a view of a nozzle inspection apparatus according to an embodiment.

As shown in FIG. 1, an inspection apparatus 10 includes a body 11, a moving unit 14, nozzles 15, a cleaning table 17, a pump 18, a touch probe 23, and a controller 29. The controller 29 includes a receiver 31. The inspection apparatus 10 may also include a turret 13, a dummy workpiece 21, a transmitter 27, and the receiver 31.

The inspection apparatus 10 is installed in a cleaning device 20. The cleaning device 20 includes the body 11, the turret 13, the moving unit 14, the nozzles 15, the cleaning table 17, the pump 18, and the controller 29. The cleaning device 20 uses a jet 19 produced from each nozzle 15 hitting a workpiece 12 to clean the workpiece 12 or to deburr the workpiece 12. Examples of the cleaning device 20 are described in U.S. Pat. Nos. 9,364,869, 9,393,627, and 9,630,217. The cleaning device 20 may be one of the JCC Series (Sugino Machine Limited).

The cleaning table 17 is installed in the body 11. The cleaning table 17 may be swingable about a rotation axis parallel to the X-axis. The cleaning table 17 receives the workpiece 12 or the dummy workpiece 21 that is aligned and fixed at a predetermined position.

The pump 18 is a liquid pump, such as a piston pump, a gear pump, or a volute pump. The pump 18 applies a positive pressure to a cleaning liquid in a cleaning liquid tank (not shown), and feeds the cleaning liquid to the nozzle 15 through the turret 13.

The moving unit 14 is installed in the body 11. The moving unit 14 can freely move the turret 13 and the nozzles 15 relative to the cleaning table 17 in the lateral direction (X-direction), the front-rear direction (Y-direction), and the vertical direction (Z-direction).

The turret 13 is attached to the moving unit 14. The turret 13 has a rotation axis 16 parallel to the Z-axis. The turret 13 may include multiple nozzles 15. The turret 13 rotates to set one nozzle 15 in position. The turret 13 feeds the cleaning liquid to the selected nozzle 15.

Figure 6:
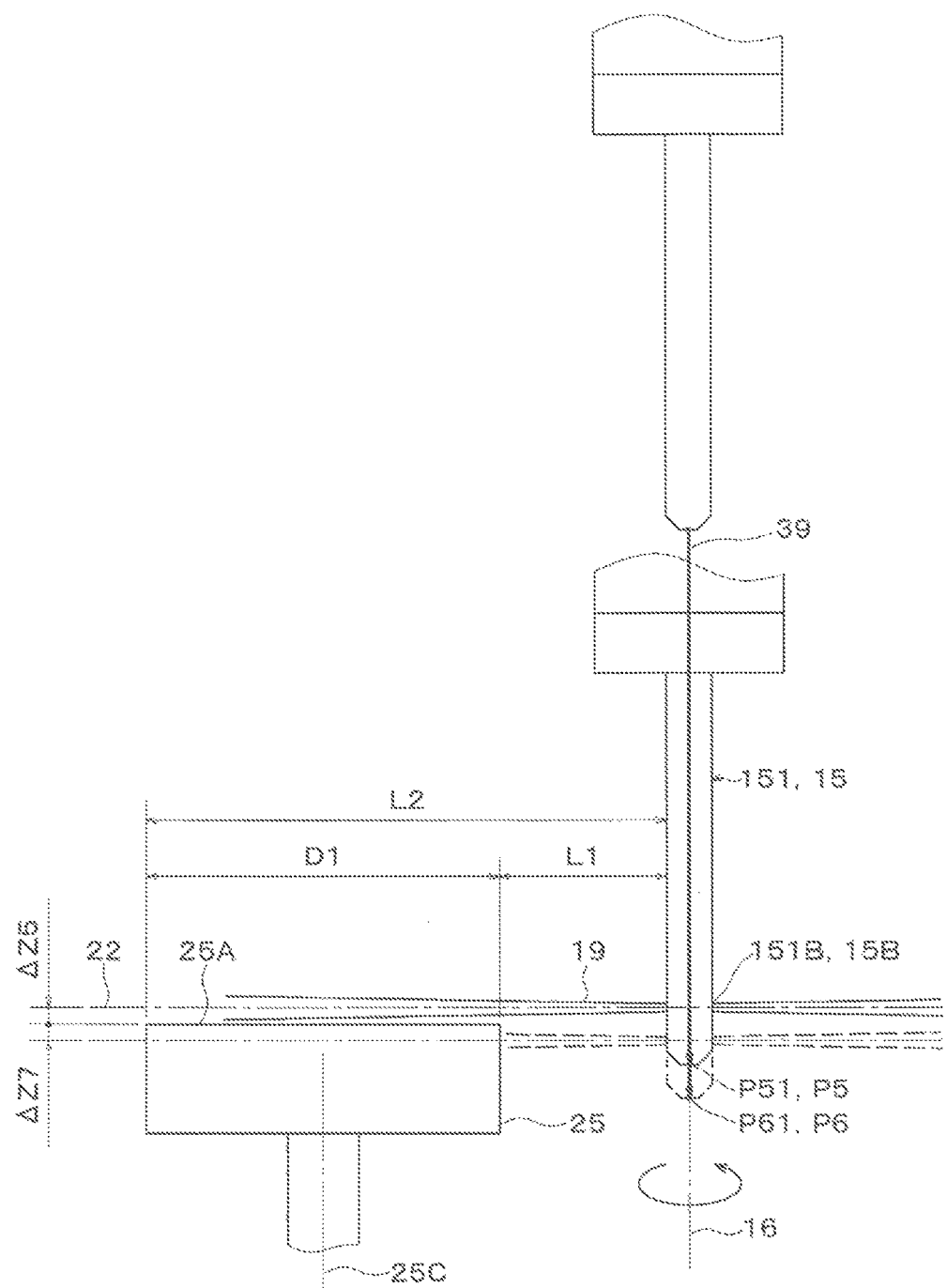
FIG. 6 is a diagram describing a method for identifying a jet from a lance according to an embodiment.

The nozzles 15 are mounted on the turret 13. As shown in FIG. 6, for example, each nozzle 15 includes a shaft 15A and ejection orifices 15B. Each nozzle 15 may be rotatable about the rotation axis 16 or may be positioned in the rotation direction. Each nozzle 15 may be, for example, a lance 151, an angled jet lance 152, a lateral jet nozzle 153, a straight jet nozzle 154, or a fan jet nozzle 155. Each ejection orifice 15B produces a high-pressure jet 19 along an axis 22.

The dummy workpiece 21 has a shape similar to the workpiece 12 at least at the joint with the cleaning table 17. The cleaning table 17 receives, in place of the workpiece 12, the dummy workpiece 21 fixed at a mount position for the workpiece 12. The dummy workpiece 21 includes a touch probe 23. The touch probe 23 includes a stylus 25. The stylus 25 is preferably disc-shaped. The stylus 25 has an upper surface 25A, a cylindrical surface 25B, and a center line 25C. The upper surface 25A is a top surface of the stylus 25. The dummy workpiece 21 includes the transmitter 27. The touch probe 23 detects a contact on the stylus 25 upon receiving a force larger than or equal to a detection force. In response to this, the transmitter 27 wirelessly transmits a contact signal to the receiver 31. More specifically, the transmitter 27 generates a contact signal in response to a force acting on the stylus 25.

The touch probe 23 may be directly fixed to the cleaning table 17 without the dummy workpiece 21 between the touch probe 23 and the cleaning table 17. The touch probe 23 may instead be fixed to an engagement member such as a pallet to be engageable or removable at a predetermined position on the cleaning table 17, which is different from the mount position of the workpiece 12.

The touch probe 23 may be prefixed at a predetermined position of the body 11. In this case, the cleaning device 20 may also include a shutter or a cover (not shown) that covers the touch probe 23 during cleaning of the workpiece 12.

The controller 29 may include a numerical controller. The controller 29 numerically controls the moving unit 14 and the cleaning table 17. The receiver 31 receives contact signals.

The transmitter 27 and the receiver 31 may perform wired communication, instead of wireless communication.

Figure 2:
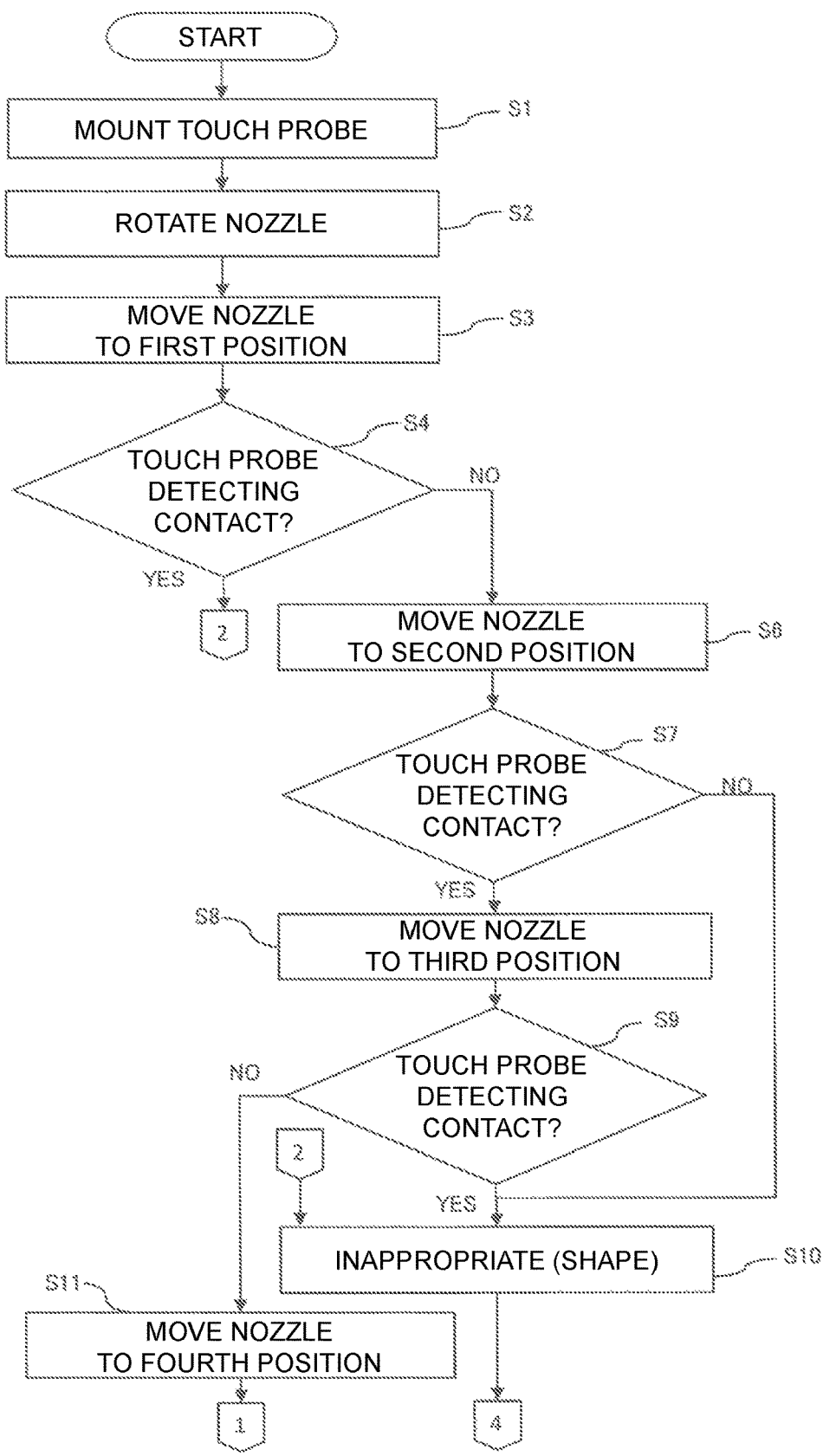
FIG. 2 is a flowchart of a nozzle inspection method according to an embodiment.
Figure 3:
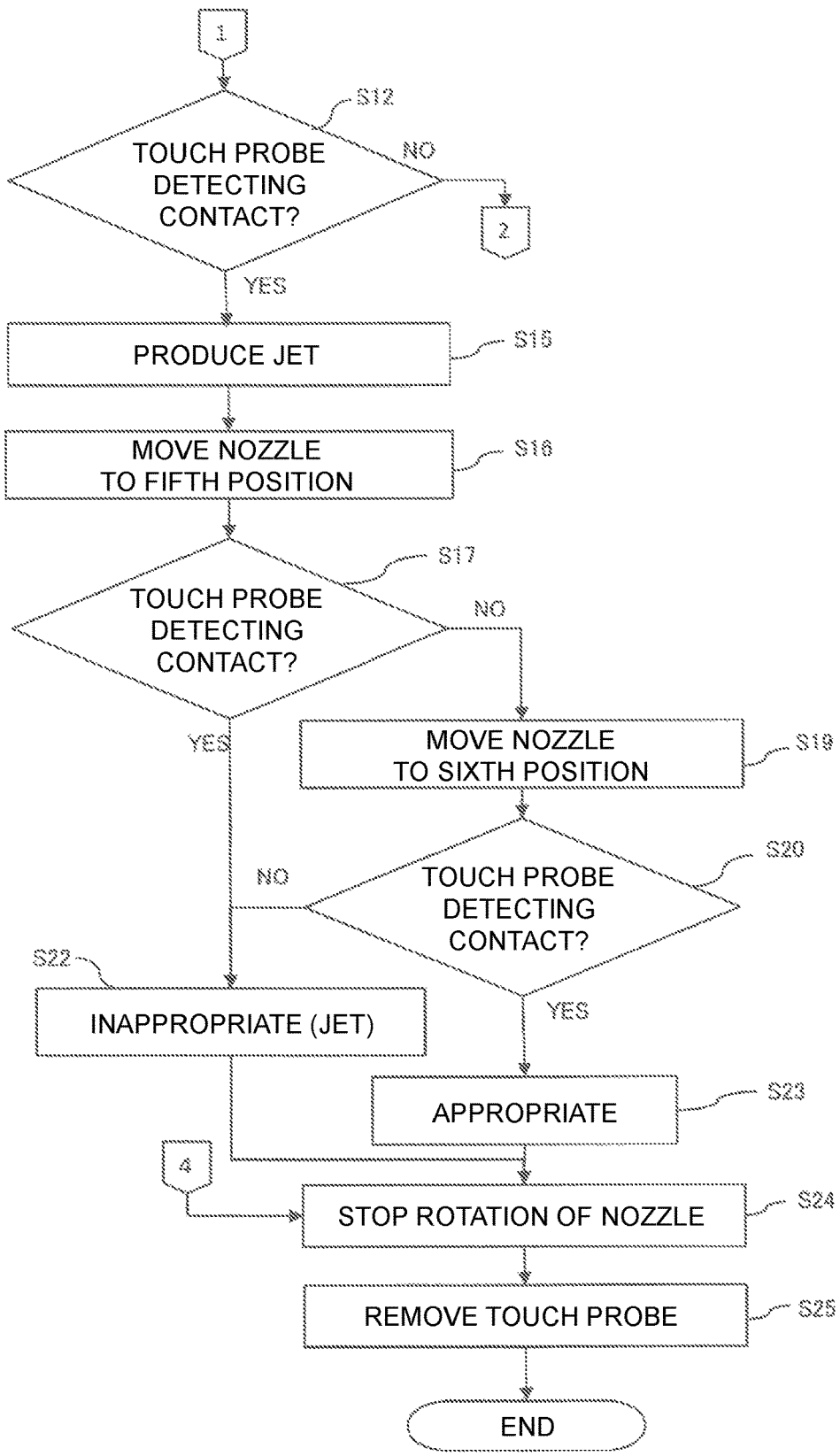
FIG. 3 is a flowchart of the nozzle inspection method according to the embodiment (continued).

Referring now to FIGS. 2 and 3, a method for inspecting the nozzles 15 for breakage will be described. An operator or a transporting device (not shown) mounts the touch probe 23 on the cleaning table 17 (S1). The controller 29 rotates the nozzles 15 about the rotation axis 16 (S2). The controller 29 moves one nozzle 15 to a first position (hereafter, position P1) (S3). When the controller 29 receives a contact signal, the processing advances to step S10. Otherwise, the processing advances to step S6 (S4). The controller 29 moves the nozzle 15 to a second position (hereafter, position P2) (S6). When the controller 29 receives a contact signal, the processing advances to step S8. Otherwise, the processing advances to step S10 (S7). Subsequently, the controller 29 moves the nozzle 15 to a third position (hereafter, position P3) (S8). When the controller 29 receives a contact signal, the processing advances to step S10. Otherwise, the processing advances to step S11 (S9). The controller 29 moves the nozzle 15 to a fourth position (hereafter, position P4) (S11). When the controller 29 receives a contact signal, the processing advances to step S15. Otherwise, the processing advances to step S10 (S12). In step S10, the controller 29 determines that the shape of the nozzle 15 is inappropriate. The processing then advances to step S24.

Subsequently, the controller 29 causes the nozzle 15 to produce the jet 19 (S15). The controller 29 moves the nozzle 15 to a fifth position (hereafter, position P5) (S16). When the controller 29 receives a contact signal, the processing advances to step S22. Otherwise, the processing advances to step S19 (S17). The controller 29 moves the nozzle 15 to a sixth position (hereafter, position P6) (S19). When the controller 29 receives a contact signal, the processing advances to step S23. Otherwise, the processing advances to step S22 (S20). In step S22, the controller 29 determines that the jet from the nozzle 15 is inappropriate. In step S23, the controller 29 determines that the jet from the nozzle 15 is appropriate. The processing then advances to step S24.

The controller stops rotating the nozzle 15 (S24). Finally, the operator or the transporting device removes the touch probe 23 from the cleaning table 17 (S25).

Steps S1 to S12 and steps S24 to S25 may be eliminated.

A method for identifying the shape of the nozzle 15 (steps S3 to S12) will now be described in detail using the lance 151 as an example. The same method can be used for the angled jet lance 152, the lateral jet nozzle 153, the straight jet nozzle 154, and the fan jet nozzle 155. Positions P1 to P6 and paths 35 to 43 (described below) are defined assuming that the shape of the nozzle 15 and its jet shape and direction are as designed (normal).

Figure 4:
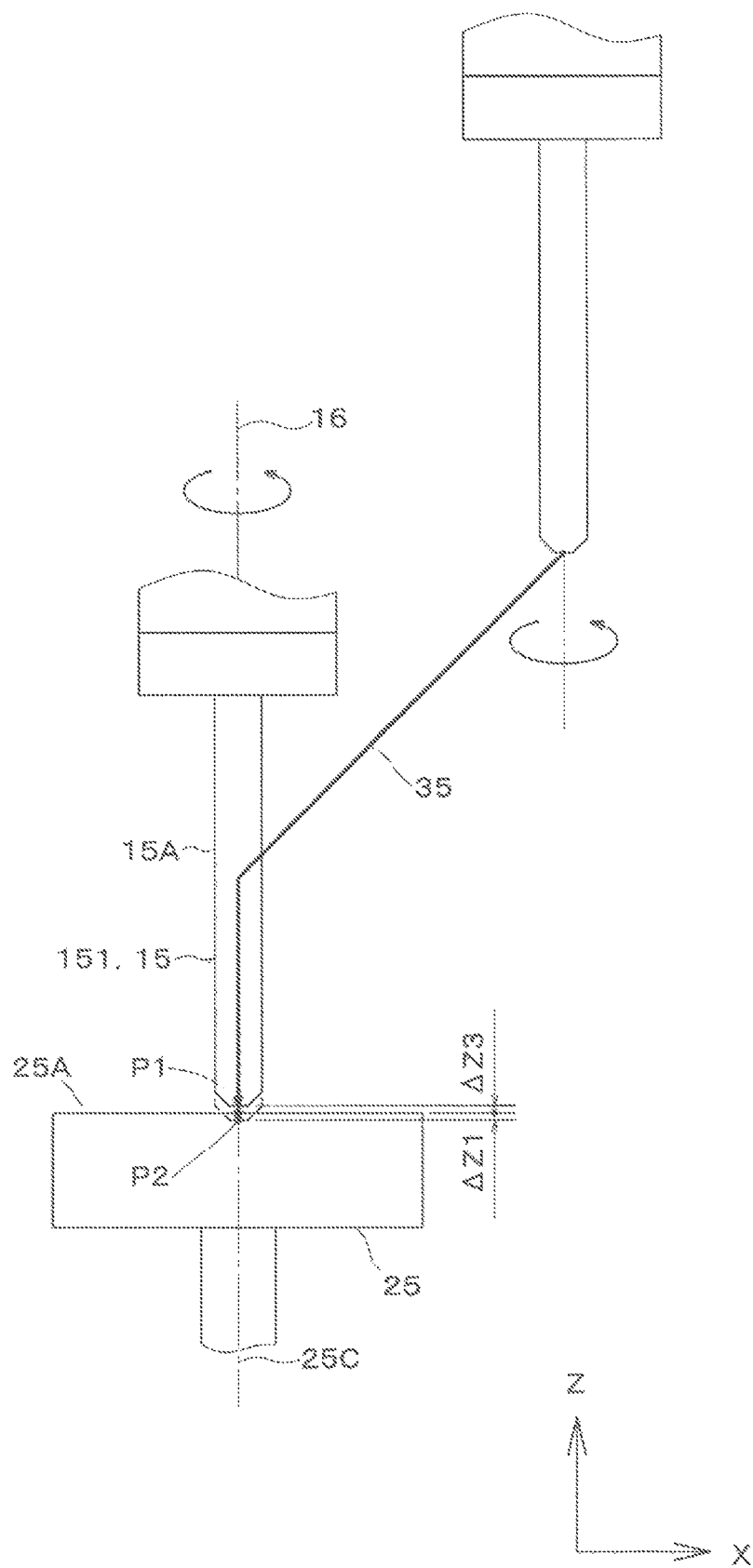
FIG. 4 is a diagram describing a method for identifying the shape of a nozzle (in Z-direction) according to an embodiment.

Steps S3 to S7 will be described with reference to FIG. 4. The lance 151 includes the shaft 15A, which extends along the rotation axis 16, and multiple ejection orifices 151B located in the direction perpendicular to the rotation axis 16 on the distal end of the shaft 15A. At the position P1, the shaft 15A is on a center line 25C at a distance $\Delta Z3$ upward from the upper surface 25A (+Z-direction) of the stylus 25. At the position P2, the shaft 15A is on the center line 25C at a distance $\Delta Z1$ from the upper surface 25A toward the basal end of the stylus 25 (−Z-direction). The distance $\Delta Z1$ is the upper limit of the allowable range from a reference length of the lance 151. The distance $\Delta Z3$ is the lower limit of the allowable range from a reference length of the lance 151. The distances $\Delta Z1$ and $\Delta Z3$ are determined based on the finished dimensional accuracy, assembly accuracy, and positioning accuracy of the lance 151. More specifically, the distances $\Delta Z1$ and $\Delta Z3$ are normal distances (second normal distances) calculated from the normal nozzle shape.

In step S3, the controller 29 moves the lance 151 along the path 35, on which the lance 151 does not contact the stylus 25, and moves the lance 151 to the position P1. Preferably, the path 35 extends along the center line 25C near its terminal end. Positioning hereafter refers to fast forwarding. The positioning may include linear movement.

Step S4 may be performed in parallel with step S3.

In step S6, the controller 29 linearly moves the lance 151 to the position P2 at a constant speed. The speed may specifically be 50 to 200 mm per minute (inclusive).

Step S7 may be performed in parallel with step S6.

Figure 5:
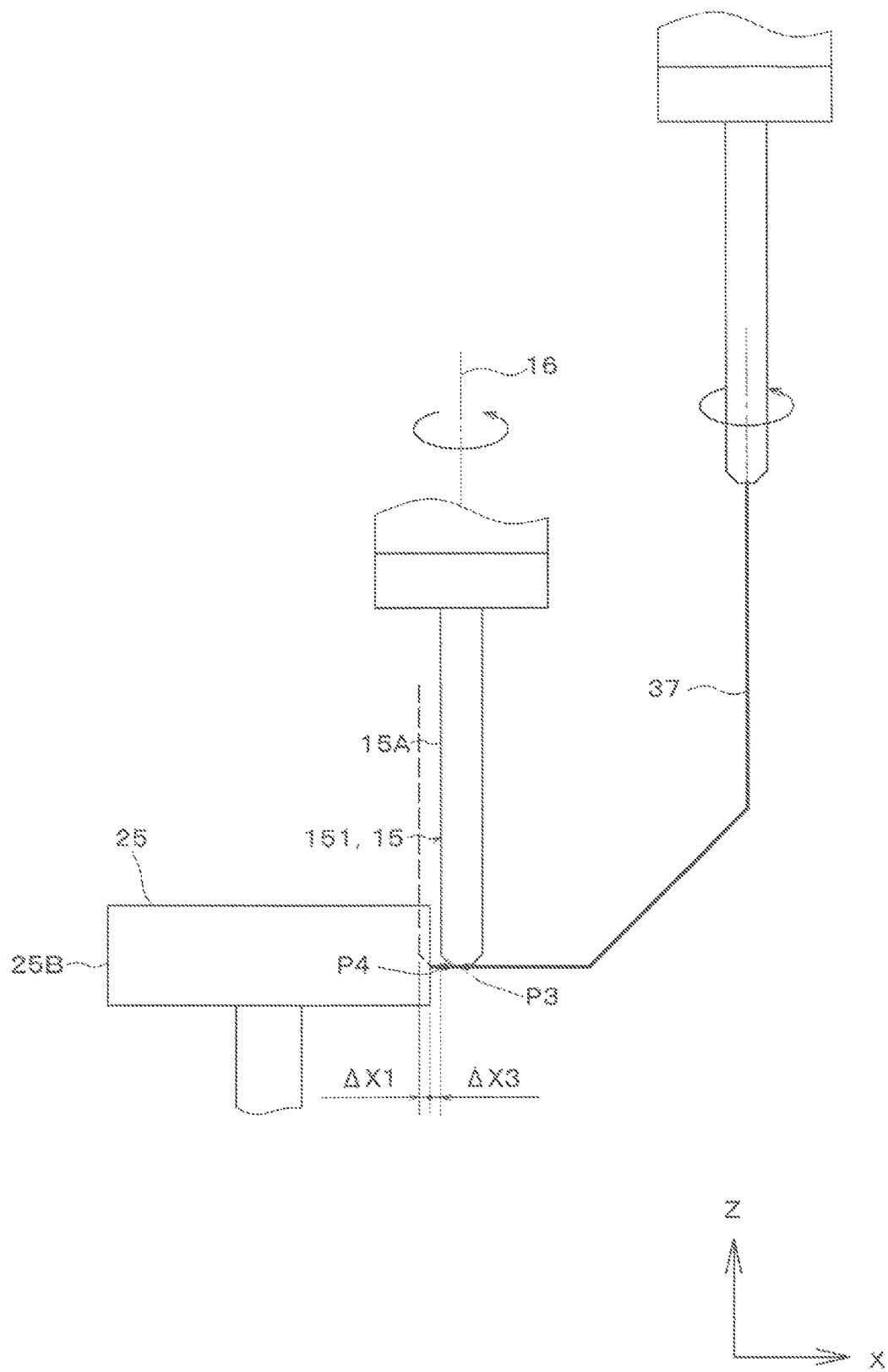
FIG. 5 is a diagram describing a method for identifying the shape of a nozzle (in X-direction) according to an embodiment.

Steps S8 to S12 will be described with reference to FIG. 5. At the position P3, the shaft 15A is at a distance $\Delta X3$ from the cylindrical surface 25B. The position P4 is at the same level as the position P3. At the position P4, the shaft 15A is located at a distance $\Delta X1$ inward from the cylindrical surface 25B. The positions P3 and P4 may be determined to allow the distal end of the lance 151 to contact a middle portion of the cylindrical surface 25B at height H. The distance $\Delta X3$ corresponds to the sum of the allowable deflection and the maximum tolerance from a reference radius of the shaft 15A. The distance $\Delta X1$ corresponds to a minimum tolerance from the reference radius of the shaft 15A. The distances $\Delta X1$ and $\Delta X3$ are normal distances (second normal distances) calculated from the normal nozzle shape.

In step S8, the controller 29 moves the lance 151 along a path 37, on which the lance 151 does not contact the stylus 25, and moves the lance 151 to the position P3. Preferably, the path 37 is redirected in X-direction near its terminal end.

Step S9 may be performed in parallel with step S8.

In step S11, the controller 29 linearly moves the lance 151 to the position P4 at a constant speed. Preferably, the speed is 50 to 200 mm per minute (inclusive).

Step S12 may be performed in parallel with step S11.

In step S10, the controller 29 determines that the shape of the lance 151 is inappropriate. The controller 29 determines that the lance 151 has breakage.

In steps S3 to S7, the distal end of the lance 151 is moved toward the upper surface 25A of the stylus 25. When the lance 151 contacts the stylus 25 in a normal range for the first time, the controller 29 determines that the length of the lance 151 is normal.

In steps S8 to S12, the side surface of the lance 151 is radially moved toward the cylindrical surface 25B of the stylus 25. When the lance 151 contacts the stylus 25 in a normal range for the first time, the controller 29 determines that the total runout of the lance 151 is normal.

In steps S8 to S12, the lance 151 is moved in X-direction toward the stylus 25. The lance 151 may be moved in Y-direction, instead of X-direction.

Step S2 may not be performed after step S1, but may be performed immediately before step S8. Further, steps S3 to S7 and steps S8 to S12 may be exchanged.

When step S2 is eliminated, steps S8 to S12 may be repeatedly performed with the lance 151 being moved toward the stylus 25 in Y-direction.

A method for inspecting an ejection direction (steps S15 to S23) will now be described in detail. Unless otherwise specified, the inspection method is performed with the same procedure independently of the types of the nozzles 15. However, the positions P5 and P6 may vary depending on the type of the nozzles 15. The method for inspecting the lance 151 will now be described below with reference to FIG. 6.

A position P51 (fifth position) is determined to have the rotation axis 16 at a distance L1 from the cylindrical surface 25B (+X-direction in the figure) and the axis 22 at a distance ΔZ5 upward from the upper surface 25A of the stylus 25 (+Z-direction in the figure). The distance L1 is determined based on the distance from the lance 151 to a wall surface of a hole extending through the workpiece 12, during cleaning. The distance ΔZ5 is determined as a tolerance of the hitting position of the jet corresponding to the distance L1.

The distance ΔZ5 may be determined based on the diameter of each ejection orifice 151B and the distance L2. The distance L2 herein is the sum of the outer diameter of the stylus 25 and the distance L1. The distances L1 and ΔZ5 can be appropriately determined in accordance with the impulsive force of the jet 19 on the stylus 25.

The position P61 (sixth position) is on the extension of the rotation axis 16 extending from the position P51, and is determined to have the axis 22 at a distance ΔZ7 from the upper surface 25A toward the basal end of the stylus 25 (−Z-direction in the figure). The distance ΔZ7 is determined based on the range in which the jet 19 hits in the height direction (−Z-direction in the figure) at the distance L1. The position P61 is the position of the jet 19 nearest the basal end of the stylus 25 detectable by the stylus 25.

The distances ΔZ5 and ΔZ7 are normal distances (first normal distances) calculated from the normal jet shape.

In step S15, the pump 18 feeds the cleaning liquid to the nozzle 15. Thus, the nozzle 15 produces the jet 19. The jet 19 has a stabilized shape when the pressure inside the nozzle 15 increases sufficiently. After the jet 19 is stabilized, step S16 is performed.

In step S16, the controller 29 moves the lance 151 to the position P51. The lance 151 herein moves along a path 39 on which the jet 19 does not contact the stylus 25. Preferably, the path 39 extends parallel to the center line 25C near its terminal end.

Step S17 may be performed in parallel with step S16.

In step S19, the controller 29 linearly moves the lance 151 to a position P61 at a constant speed. Preferably, the speed is 50 to 200 mm per minute (inclusive).

Step S20 may be performed in parallel with step S19.

In step S22, the controller 29 determines that the jet 19 is inappropriate. In other words, the controller 29 determines that the jet 19 is abnormal due to clogging or wear of the ejection orifices 15B.

Figure 7:
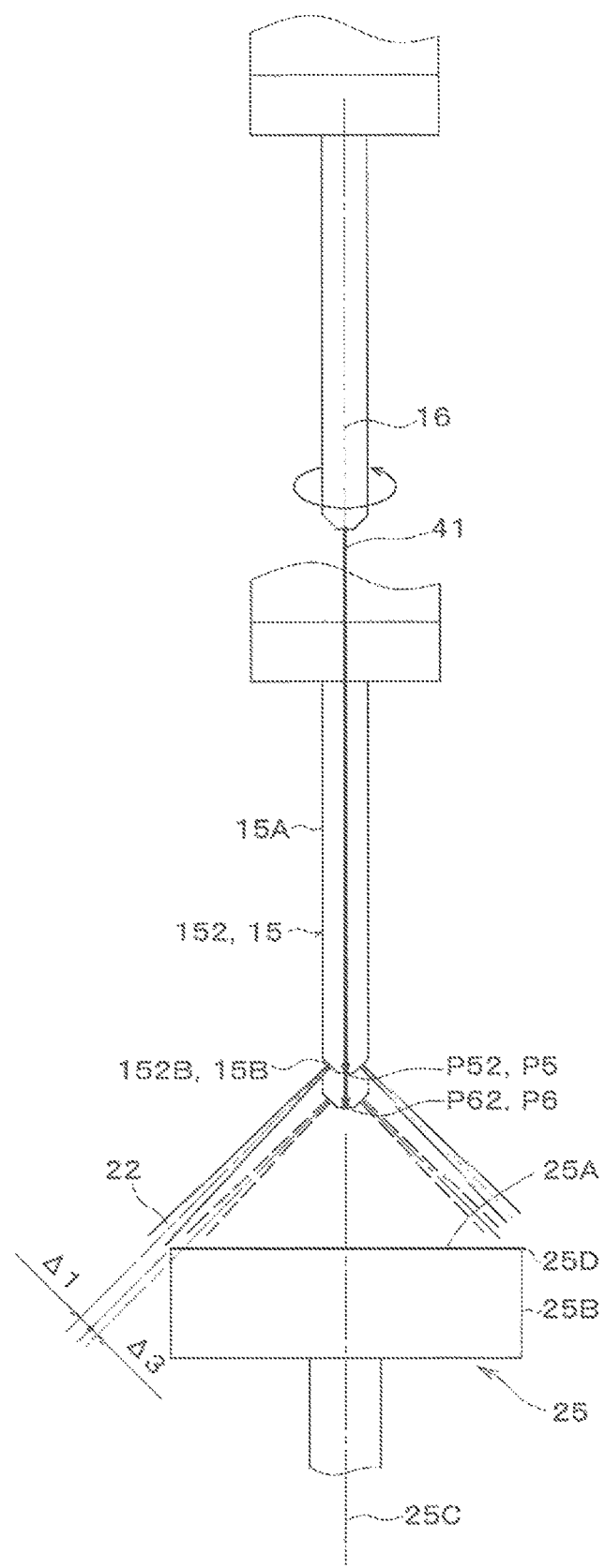
FIG. 7 is a diagram describing a method for identifying a jet from an angled jet lance according to an embodiment.

A method for inspecting the jet 19 from the angled jet lance 152 will now be described with reference to FIG. 7. The angled jet lance 152 includes multiple ejection orifices 152B at the distal end of the shaft 15A at an angle with respect to the rotation axis 16.

A position P52 (fifth position) is determined to have the center line 25C and the rotation axis 16 coaxially aligned, each axis 22 not crossing the stylus 25, and the axis 22 and an edge 25D of the upper surface 25A at a distance Δ1 between them. A position P62 (sixth position) is determined to have the center line 25C and the rotation axis 16 coaxially aligned, the axis 22 crossing the stylus 25, and the axis 22 and the edge 25D at a distance Δ3 between them. The distances Δ1 and Δ3 are determined in accordance with the allowable inclination of each jet 19 and the diameter of the ejection orifices 152B. More specifically, the distances Δ1 and Δ3 are normal distances (first normal distances) calculated from the normal jet shape.

In step S16, the angled jet lance 152 moves along a path 41. The path 41 extends along the center line 25C at least within the range in which the jet 19 approaches the stylus 25.

Figure 8:
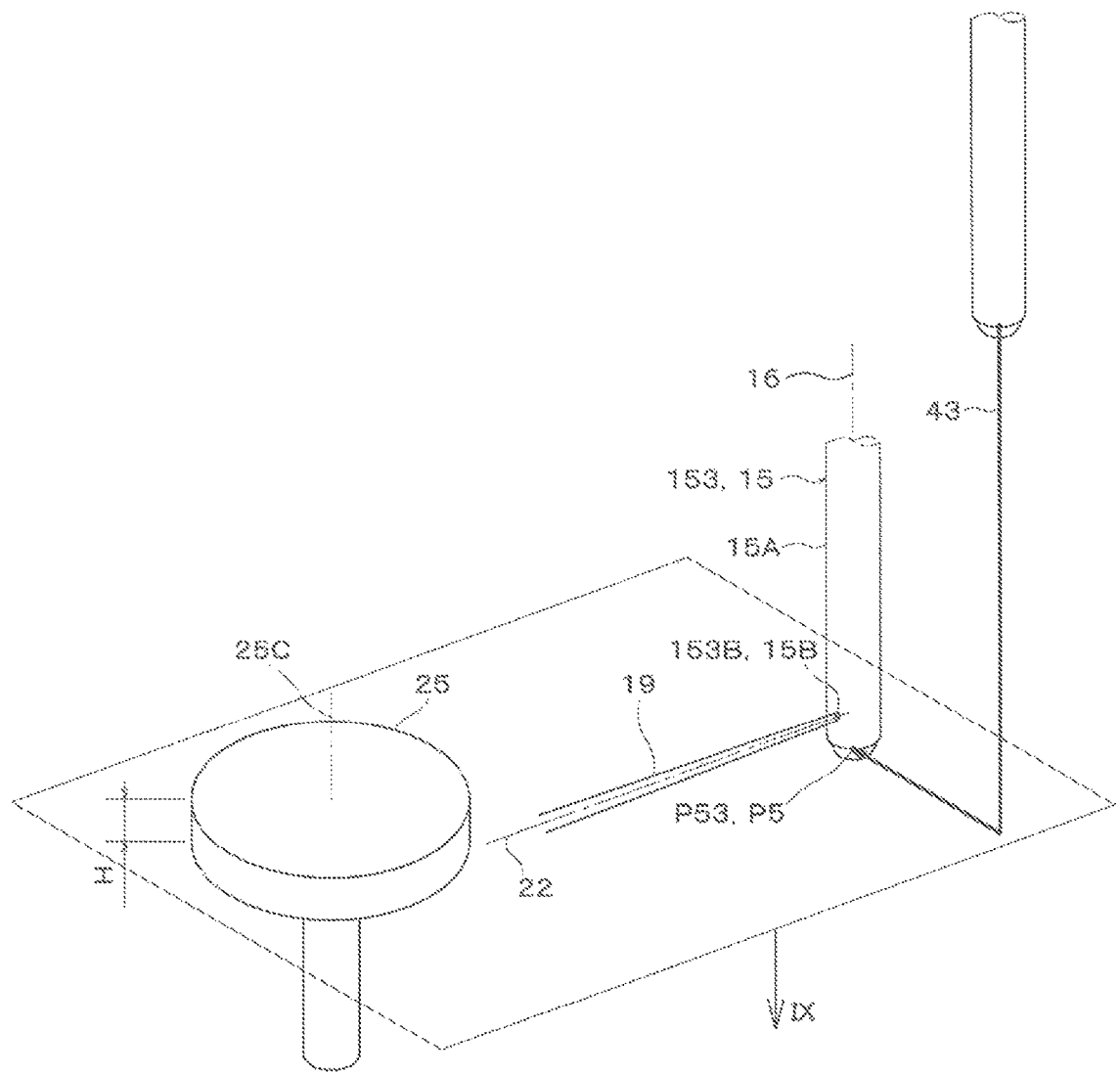
FIG. 8 is a diagram describing a method for identifying a jet from a lateral jet nozzle according to an embodiment.
Figure 9:
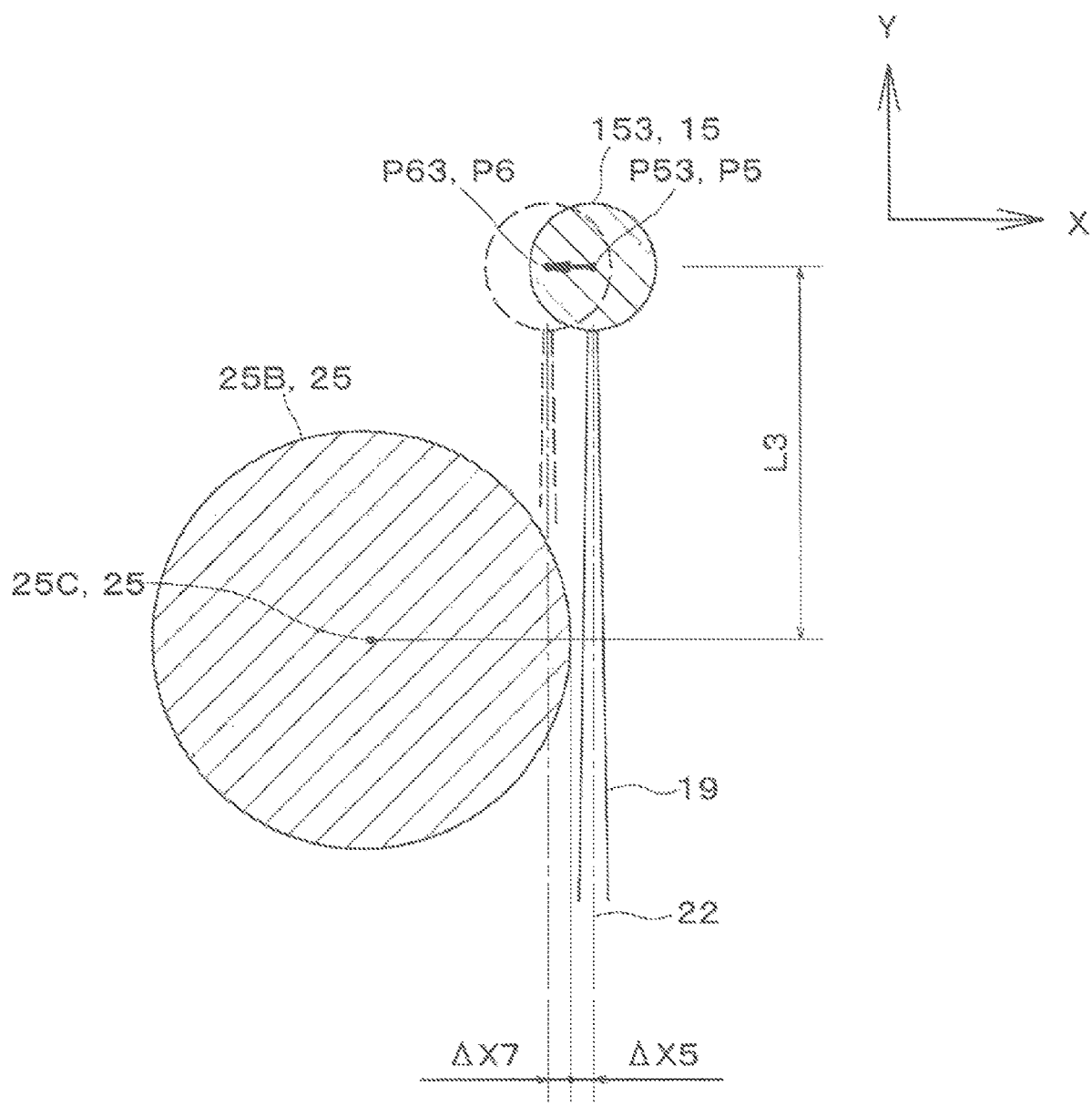
FIG. 9 is a cross-sectional view taken along plane IX in FIG. 8.

A method for inspecting the jet from the lateral jet nozzle 153 will now be described with reference to FIGS. 8 and 9. The lateral jet nozzle 153 includes one ejection orifice 153B located in the direction perpendicular to the rotation axis 16 on the distal end of the shaft 15A. Before step S15 for inspecting the lateral jet nozzle 153, the lateral jet nozzle 153 is positioned about the rotation axis 16 to have the axis 22 extending in a predetermined direction (−Y-direction in the figure).

The position P53 (fifth position) and the position P63 (sixth position) are determined at around a middle in the height H of the stylus 25. A plane including the positions P53 and P63 and perpendicular to the rotation axis 16 is referred to as a plane IX.

At the position P53, the axis 22 is at a distance ΔX5 from the tangent of the cylindrical surface 25B, and at a distance L3 from the center line 25C in the tangential direction (+Y-direction in the figure). The distance ΔX5 is a maximum tolerance at which the jet 19 does not contact the stylus 25. At the position P63, the axis 22 is positioned in the same rotation direction as at the position P53, and the axis 22 is at the distance L3 in the tangential direction, and at a distance ΔX7 radially inward from the tangent of the cylindrical surface 25B. The distances ΔX5 and ΔX7 are determined based on the positioning accuracy of the lateral jet nozzle 153, the diameter of the ejection orifice 153B, the divergence of the jet 19, and the distance L3. More specifically, the distances ΔX5 and ΔX7 are normal distances (first normal distances) calculated from the normal jet shape.

In step S16, the jet 19 passes along the path 43 on which the jet 19 does not contact the stylus 25. Preferably, the path 43 extends in the radial direction of the stylus 25 and in the direction perpendicular to the axis 22 (X-direction in the figure) near its terminal end.

Figure 10:
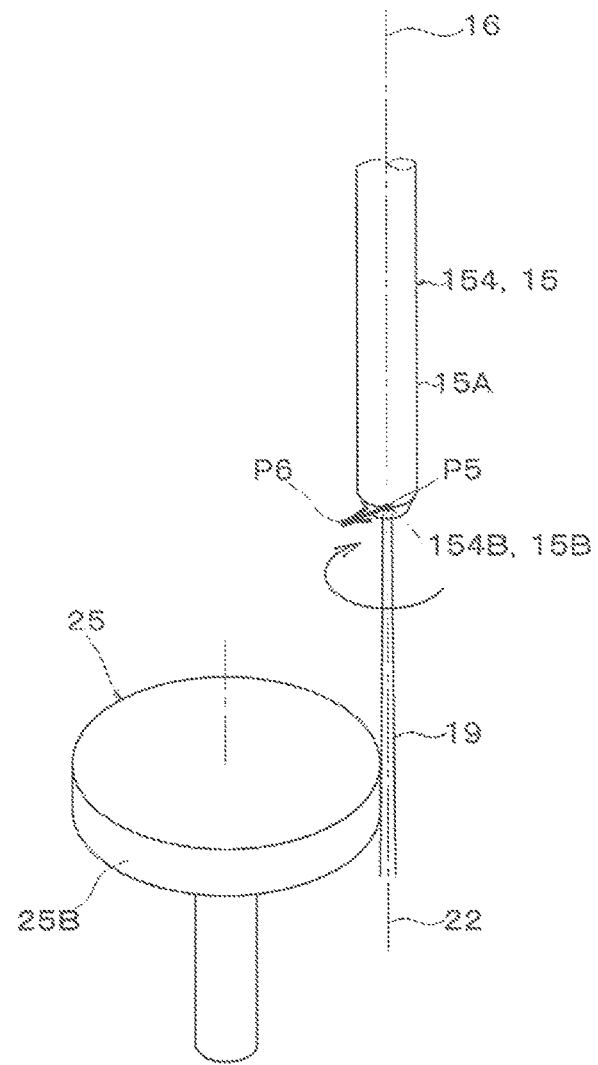
FIG. 10 is a diagram describing a method for identifying a jet from a straight jet nozzle according to an embodiment.
Figure 10:
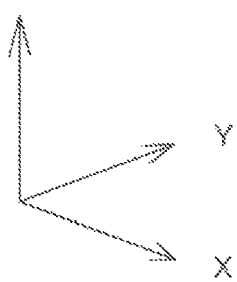

A method for inspecting the jet from the straight jet nozzle 154 will now be described with reference to FIG. 10. The straight jet nozzle 154 includes an ejection orifice 154B, which ejects a linear jet 19 along the rotation axis 16, at the distal end of the shaft 15A. While rotating, the straight jet nozzle 154 gradually moves the jet 19 toward the stylus 25 along the cylindrical surface 25B (refer to FIG. 10) or along the upper surface 25A. This allows identification of the jet inclination.

Figure 11:
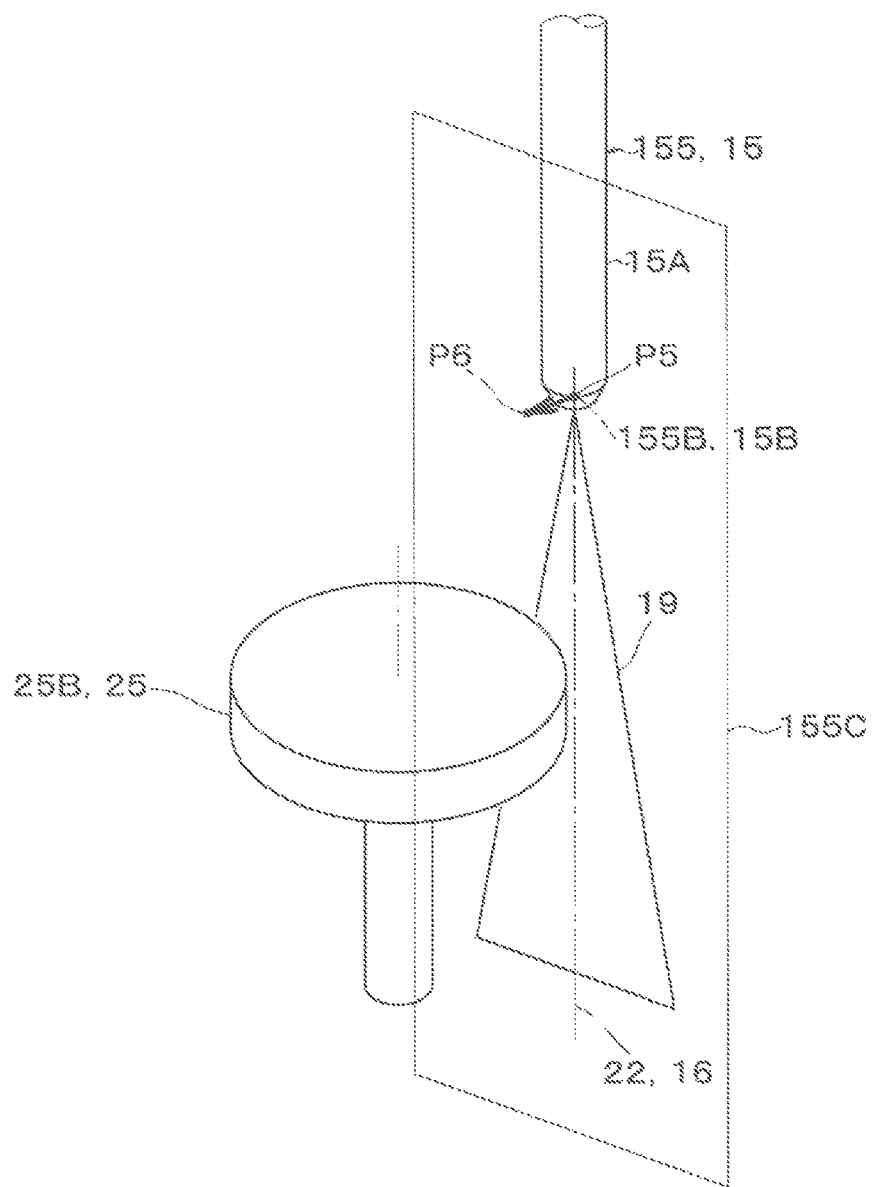
FIG. 11 is a diagram describing a method for identifying a jet from a fan jet nozzle according to an embodiment.

A method for inspecting the jet from the fan jet nozzle 155 will now be described with reference to FIG. 11. The fan jet nozzle 155 includes an ejection orifice 155B at the distal end of the shaft 15A, through which the jet 19 is ejected to spread in a fan shape on a plane 155C including the rotation axis 16. Before step S15 for inspecting the jet from the fan jet nozzle 155, the fan jet nozzle 155 is positioned in the rotation direction to determine the direction in which the jet 19 spreads (X-direction in FIG. 11). The jet 19 moves toward the stylus 25 in the direction perpendicular to the plane 155C (Y-direction in FIG. 11).

The positions P1, P3, and P5 correspond to search start positions. The positions P2, P4, and P6 correspond to search end positions.

Steps S1 to S24 may be performed for each of multiple nozzles 15 mounted on the turret 13.

The cleaning device 20 implements the inspection method according to the present embodiment using the dummy workpiece 21 mounted on the cleaning table 17 instead of the workpiece 12 at constant frequencies. The cleaning device 20 may implement the inspection method according to the present embodiment every after cleaning a predetermined number of (e.g., 100) workpieces 12, every after a predetermined period (e.g., ten hours) passes, or regularly (e.g., every business day).

A transporting device may instruct the cleaning device 20 to implement the method for inspecting the nozzle 15 for any breakage after the dummy workpiece 21 is mounted on the cleaning table 17. In response to the instruction, the cleaning device 20 implements the inspection method according to the present embodiment.

The inspection method according to the present embodiment enables inspection of the shape and the ejection state of the nozzle 15 inside the cleaning device 20 using the touch probe 23. Inspecting the nozzle 15 with appropriate frequencies ensures that the cleaning device 20 is in the normal state.

The inspection apparatus 10 includes the touch probe 23 mounted on the dummy workpiece 21 and thus accurately mounted on the cleaning table 17. In addition, the touch probe 23 on the dummy workpiece 21 can be mounted onto the body 11 for use only at inspection. The cleaning device 20 ejects a high-pressure jet 19 in every direction. The jet 19 hitting the workpiece 12 bounces. The jet hitting the workpiece 12 contains burrs, chips, and other foreign matter adhering to the workpiece 12. Removing the touch probe 23 from the body 11 prevents the jet or such foreign matter from undesirably hitting the touch probe 23, and thus can extend the life of the touch probe 23. The touch probe 23 is mounted only at inspection. This structure provides a wider space for cleaning. With the transmitter 27 and the receiver 31 communicating wirelessly, the dummy workpiece 21 can be handled easily.

The embodiments disclosed herein should not be construed to be restrictive, but may be modified variously without departing from the scope and spirit of the invention, and to cover all technical matters falling within the technical ideas defined by the appended claims. Although preferred exemplary embodiments have been shown and described, it will be apparent to those skilled in the art that various changes, modifications, alterations, or improvements may be made to the invention in view of the disclosure herein, and all such variations are considered within the scope of the invention.

REFERENCE SIGNS LIST 10 inspection apparatus
14 moving unit
15 nozzle
17 cleaning table
19 jet
21 dummy workpiece
23 touch probe
25 stylus
27 transmitter
29 controller
31 receiver

What is claimed is:

1. A nozzle inspection method, comprising:
rotating a nozzle about a rotation axis;
producing a jet from the nozzle with the nozzle located inside a cleaning device;
moving, by a moving unit installed inside the cleaning device, the nozzle that is freely movable in a lateral direction, a front-rear direction, and a vertical direction inside the cleaning device to cause the jet to approach a stylus of a touch probe;
generating a contact signal under a force acting on the stylus; and
determining that the jet is appropriate in response to the contact signal received first after an axis of the jet is positioned at a distance from an outer surface of the stylus that is equal to or less than a first distance calculated from a designed jet shape.

2. The nozzle inspection method according to claim 1, further comprising:
moving the nozzle to a search start position at which the axis of the jet is positioned at the first distance from the outer surface of the stylus;
moving the nozzle from the search start position to a search end position at which the axis of the jet is positioned at the first distance toward a center of the stylus from the outer surface of the stylus; and
determining that the jet is appropriate in response to no contact signal received when moving the nozzle to the search start position and the contact signal received when moving the nozzle from the search start position to the search end position.

3. The nozzle inspection method according to claim 1, further comprising:
moving the nozzle perpendicularly to the axis of the jet.

4. The nozzle inspection method according to claim 1, further comprising:
moving the nozzle toward the stylus; and
determining that a shape of the nozzle is appropriate in response to a contact signal received first after the nozzle is at a distance from the outer surface of the stylus that is equal to or less than a second distance calculated from a designed nozzle shape.

5. The nozzle inspection method according to claim 4, further comprising:
moving the nozzle from above the stylus having a cylindrical shape to an upper surface of the stylus; and
moving the nozzle in a radial direction of the stylus to a cylindrical surface of the stylus.

6. The nozzle inspection method according to claim 1, further comprising:
mounting a dummy workpiece to which the touch probe is fixed onto a mount table of the cleaning device; and
removing the dummy workpiece from the mount table after inspecting a jet or a shape of the nozzle.

7. The nozzle inspection method according to claim 2, further comprising:
moving the nozzle perpendicularly to the axis of the jet.

8. The nozzle inspection method according to claim 2, further comprising:

moving the nozzle toward the stylus; and determining that a shape of the nozzle is appropriate in response to a contact signal received first after the nozzle is at a distance from the outer surface of the stylus that is equal to or less than a second distance calculated from a designed nozzle shape.

9. The nozzle inspection method according to claim 3, further comprising:

moving the nozzle toward the stylus; and determining that a shape of the nozzle is appropriate in response to a contact signal received first after the nozzle is at a distance from the outer surface of the stylus that is equal to or less than a second distance calculated from a designed nozzle shape.

10. The nozzle inspection method according to claim 8, further comprising:

moving the nozzle from above the stylus having a cylindrical shape to an upper surface of the stylus; and moving the nozzle in a radial direction of the stylus to a cylindrical surface of the stylus.

11. The nozzle inspection method according to claim 9, further comprising:

moving the nozzle from above the stylus having a cylindrical shape to an upper surface of the stylus; and moving the nozzle in a radial direction of the stylus to a cylindrical surface of the stylus.

12. A nozzle inspection method, comprising:

rotating, by a turret located inside a cleaning device, a nozzle in a rotation direction;

producing a jet from the nozzle located on the turret;

moving, by a moving unit installed inside the cleaning device, the nozzle that is freely movable in a lateral direction, a front-rear direction, and a vertical direction inside the cleaning device to cause the jet to approach a stylus of a touch probe;

generating a contact signal under a force acting on the stylus; and determining that the jet is appropriate in response to the contact signal received first after an axis of the jet is positioned at a distance from an outer surface of the stylus that is equal to or less than a first distance calculated from a designed jet shape.

13. The nozzle inspection method according to claim 1, further comprising:

positioning a direction of the nozzle about the rotation axis before producing the jet from the nozzle.

* * * * *